(12) United States Patent
Dubouis et al.

(10) Patent No.: US 7,531,592 B2
(45) Date of Patent: May 12, 2009

(54) USE OF MIXTURES BASED ON PT AND ON COMPOUNDS BASED ON TRANSITION METALS OTHER THAN PT, FOR ENHANCING THE ARC-RESISTANCE PROPERTIES OF SILICONE ELASTOMERS

(75) Inventors: Raymond Dubouis, Corbas (FR); Alain Pouchelon, Meyzieu (FR); Christian Pusineri, Serezin du Rhone (FR)

(73) Assignee: Rhodia Chimie, Aubervilliers (FR)

( * ) Notice: Subject to any disclaimer, the term of this patent is extended or adjusted under 35 U.S.C. 154(b) by 50 days.

(21) Appl. No.: 11/806,069

(22) Filed: May 29, 2007

(65) Prior Publication Data
US 2008/0139695 A1    Jun. 12, 2008

Related U.S. Application Data

(63) Continuation of application No. 09/331,959, filed as application No. PCT/FR97/02444 on Dec. 29, 1997, now abandoned.

(30) Foreign Application Priority Data
Dec. 31, 1996  (FR) .................................. 96 16384

(51) Int. Cl.
*C08K 3/22* (2006.01)
(52) U.S. Cl. .......................... 524/431; 524/403; 528/15
(58) Field of Classification Search ................. 524/431, 524/403; 528/15
See application file for complete search history.

(56) References Cited

U.S. PATENT DOCUMENTS

| 4,110,300 A | 8/1978 | Matsushita |
| 4,320,044 A | 3/1982 | Nakamura |
| 4,699,813 A | 10/1987 | Cavezzan |
| 4,701,488 A | 10/1987 | Williams |
| 5,008,317 A | 4/1991 | Wolfer et al. |
| 5,023,295 A | 6/1991 | Bosch et al. |
| 5,416,147 A | 5/1995 | Takarada et al. |
| 5,543,450 A | 8/1996 | Takita et al. |
| 5,641,827 A | 6/1997 | Chang et al. |
| 6,303,728 B1 | 10/2001 | Hagimori et al. |

FOREIGN PATENT DOCUMENTS

| EP | 0 347 349 A1 | 12/1989 |
| EP | 0 604 104 A3 | 6/1994 |
| JP | 50 97644 | 8/1975 |
| JP | 53 6356 | 1/1978 |
| JP | 40 23865 | 1/1992 |

OTHER PUBLICATIONS

Tran, H., "Materials for Advanced Microlithography: Polymers for 157 nm Lithography and Acid Diffusion Measurements," Ph.D. Dissertation, University of Texas at Austin, May 2002.
Database WPI, Section Ch, Week 7809, Derwent Publications Ltd., London, GB; AN 78-16883A, XP002041952 & JP 53 006 356 A (Toshiba Silicone KK), Jan. 20, 1978.
Database WPI, Section Ch, Week 7809, Derwent Publications Ltd., London, GB; AN 92-077272, XP002041953 & JP 10 023 865 A, Jan. 28, 1992.

*Primary Examiner*—Margaret G Moore
(74) *Attorney, Agent, or Firm*—Buchanan, Ingersoll & Rooney P.C.

(57) ABSTRACT

The invention concerns the use as additive for improving properties of resistance to arc tracking and arc erosion: of a mixture A, B or C formed by: concerning mixture A: A1: platinum; and A2: at least an inorganic compound A2.1 of a metal with several degrees of oxidation selected from the group formed by V, Cr, Mn, Fe, Co, Ni, and Cu, in which the metal atom is at a degree of oxidation higher than zero, the least possible (abbreviation: DOX mini); or A3: a combination of at least an inorganic compound A2.1 with at least an inorganic compound A2.2 in which the atom of V, Cr, Mn, Fe, Co, Ni or Cu is at a degree of oxidation higher than DOX mini; concerning mixture B: B1 platinum; and B2: at least an inorganic compound B2.1 of cerium-IV or of lanthanum-III; or B3: a combination of at least an inorganic compound B2.1 with at least an inorganic compound B2.2 of titanium-IV; concerning mixture C3: C1 platinum; and C2 a combination of constituent A2 or A3 with the constituent B2 or B3; in a polyorganosiloxane composition D for obtaining a silicon elastomer, either cross-linkable at room temperature or by heat by reaction of polyaddition in the presence of a metal catalyst, or cross-linkable at high temperature by the action of organic peroxide(s).

14 Claims, 3 Drawing Sheets

USE OF MIXTURES BASED ON PT AND ON COMPOUNDS BASED ON TRANSITION METALS OTHER THAN PT, FOR ENHANCING THE ARC-RESISTANCE PROPERTIES OF SILICONE ELASTOMERS

This application is a continuation of U.S. patent application Ser. No. 09/331,959, filed on Sep. 28, 1999 now abandoned, which is the United States national phase of International Application No. PCT/FR97/02444, filed Dec. 29, 1997 and claims priority of French Application No. 96/16384, filed Dec. 31, 1996, all of which are incorporated by reference herein in their entireties and relied upon.

The subject of the present invention is the use, as additives used for enhancing the arc-tracking and arc-erosion resistance properties:
 of mixtures based on platinum and on one or more judiciously chosen compounds of a transition metal (or metals) other than platinum,
 in polyorganosiloxane compositions for obtaining silicone elastomers, either crosslinking at room temperature or with the heat from polyaddition reactions in the presence of a metal catalyst (called RTV, LSR or polyaddition EVC compositions), or crosslinking at high temperature by the action of organic peroxides (called EVC compositions).

The expression "arc-tracking and arc-erosion resistance properties" should be understood to mean those properties of this type of silicone elastomer obtained by crosslinking so-called RTV, LSR, polyaddition EVC or EVC polyorganosiloxane compositions.

The expression "RTV", "LSR" and "EVC" are well known to those skilled in the art; RTV is the abbreviation for "Room Temperature Vulcanizing", LSR is the abbreviation for "Liquid Silicone Rubber" and EVC is the abbreviation for "Elastomère Vulcanisable àChaud" [Hot Vulcanizing Elastomer]".

It is known, from JP-A-76/035,501, to use a mixture of platinum and of a mixed iron oxide of formula $(FeO)_x$, $(Fe_2O_3)_y$, where the ratio x/y is between 0.05:1 and 1:1, to enhance the flame-resistance properties of silicone elastomers obtained from EVC compositions.

It is known, from FR-A-2,166,313 and EP-A-0,347,349, to use a mixture of platinum with at least one rare-earth metal oxide, particularly a mixture of platinum with cerium (IV) oxide $CEO_2$, to enhance the flame-resistance properties of silicone elastomers obtained from EVC compositions (FR-A-2,166,313) or RTV compositions (EP-A-0,347,349).

The Applicant has now discovered that RTV, LSR, polyaddition EVC or EVC polyorganosiloxane compositions containing this type of additive based on a mixture of platinum with a mixed iron oxide or a cerium (IV) oxide has, in addition, good arc-tracking and arc-erosion resistance properties; the Applicant has also discovered additives other than the aforementioned mixtures, which can be used to obtain silicone elastomers having good arc-tracking and arc-erosion resistance properties, while still having good flame-resistance properties and good mechanical properties, although these elastomers were obtained from polyorganosiloxane compositions of the RTV, LSR, polyaddition EVC or EVC type.

The present invention therefore relates to the use as an additive for enhancing the arc-tracking and arc-erosion resistance properties:
 of a mixture A, B or C formed from:
  * in regard to mixture A:
   A1: platinum; and
   A2: at least one inorganic compound A2.1 of a metal having several degrees of oxidation selected from the group formed by V, Cr, Mn, Fe, Co, Ni and Cu, in which the metal atom is at a degree of oxidation higher than zero, the lowest one possible (abbreviated to $DOX_{min}$); or
   A3: a combination of at least one inorganic compound A2.1 with at least one inorganic compound A2.2 in which the V, Cr, Mn, Fe, Co, Ni or Cu atom is at a degree of oxidation higher than $DOX_{min}$;
  * in regard to mixture B:
   B1: platinum; and
   B2: at least one inorganic cerium (IV) or lanthanum (III) compound B2.1; or
   B3: a combination of at least one inorganic compound B2.1 with at least one inorganic titanium(IV) compound B2.2;
  * in regard to mixture C:
   C1: platinum; and
   C2: a combination of constituent A2 or A3 with constituent B2 or B3;
 in a polyorganosiloxane composition D for obtaining a silicone elastomer, either crosslinking at room temperature or with the heat from polyaddition reactions in the presence of a metal catalyst, or crosslinking at high temperature by the action of an organic peroxide or peroxides.

Figure 1:
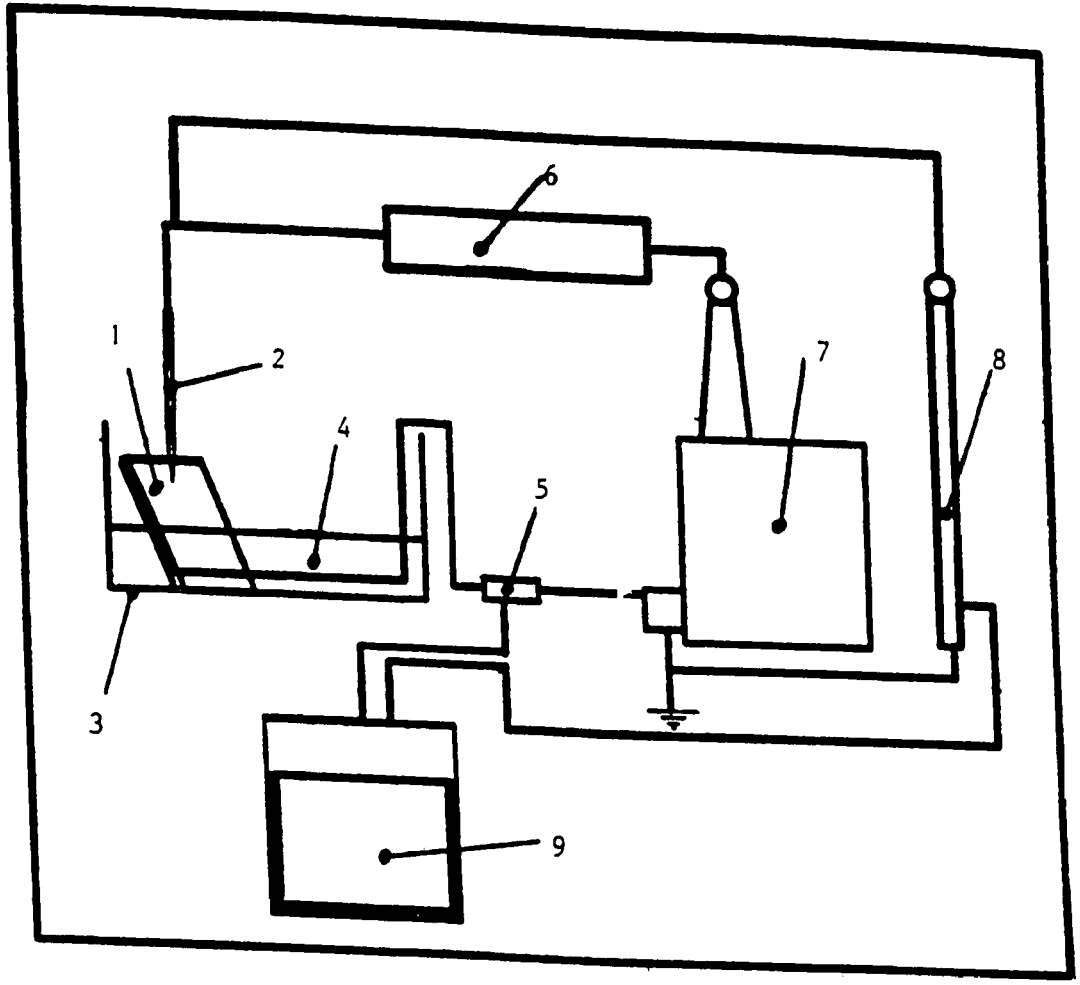
FIG. 1 is a diagrammatic representation of the arrangement used for the arc-erosion resistance tests described in detail below.

The platinum, constituent A1, B1 and C1 of mixtures A, B and C, may particularly be:
 in the form of:
  metallic (elemental) platinum, or
 in the form of:
  chloroplatinic acid $H_2PtCl_6 \cdot 6H_2O$, as described in U.S. Pat. No. 2,823,218;
  anhydrous chloroplatinic acid,
  $PtCl_2[P(CH_2—CH_2—CH_3)_3]_2$;
  complexes such as those of formulae $(PtCl_2, \text{olefin})_2$ and $H(PtCl_3,\text{olefin})$ described in U.S. Pat. No. 3,159,601, the olefin of the complex representing particularly ethylene, propylene, butylene, cyclohexene or styrene;
  $(PtCl_2, C_3H_6)_2$, a platinum chloride/cyclopropane complex, described in U.S. Pat. No. 3,159,662;
  the following products, compounds or complexes:
  $Pt(CH_3CN)_2Cl_2$, $[Pt(CH_3CN)_2(NH_3)_4]Cl_2$ $Pt(NH_3)_2Cl_2$, $K[PtCl_3(CH_2CH_2CH_2OH)]PtBr_2(C_2H_4)_2$, $K[PtBr_3(C_2H_4)]$, $PtCl_2C_2C_2H_{4\ (CH3)2}C=CH_2 \cdot PtCl_2$, $H_2Pt(CN)_4 \cdot 5H_2O$ $H[PtCl_3(CH_3CN)]$, $Pt(NH_3)_2(CNS)_2$ $[Pt\ (NH3)4] \cdot [PtCl_4]$, $PtCl_2[P(CH_2CH_3)_3]_2$, $PtCl_2 \cdot PCl_3\ _{PtCl2}, P(OH)_3$, $PtCl_2, P(OCH_2CH_3)_3\ _{PtCl2}$,

[P(OCH$_2$CH$_3$)$_3$]$_2$, Pt (OOCCH$_2$SCH$_2$CH$_3$)$_2$ $_{Pt(CN)3}$, (CH$_3$)$_4$Pt, (CH$_3$)$_3$Pt—Pt(CH$_3$)$_3$

PtCl$_2$CO and PtBr$_2$CO.

The amount of platinum, expressed in parts by weight of elemental platinum, lies within the range generally going from 1 to 250 ppm, and preferably from 3 to 100 ppm, with respect to the total weight of the polyorganosiloxane constituent(s) of the curable compositions D. In the case of compositions D of the RTV, LSR and polyaddition EVC type, the platinum constituent advantageously corresponds to the catalytic platinum normally used for carrying out the polyaddition reactions responsible for crosslinking these compositions.

With regard to constituents A2 or A3, B2 or B3 and C2 of mixtures A, B and C, the expression "inorganic compound" should be understood to mean more particularly oxides and hydroxides; these compounds are generally solids, possibly anhydrous solids, which are used in the form of particles having an average diameter not exceeding 20 μm, and preferably ranging from 0.02 to 5 μm, and a BET specific surface area of greater than or equal to 0.2 m$^2$/g and preferably ranging from 0.5 to 100 m$^2$/g.

When a group of particles is referred to as having an average diameter lying within a given range, it should be understood that more than 50% by weight of the particles have a diameter lying within the range in question.

The BET specific surface area is determined using the Brunauer, Emmet and Teller method described in "The Journal of American Chemical Society, vol. 80, page 309 (1938)" corresponding to the AFNOR NFT 45007 (November 1987) standard.

The amounts of constituents A2 or A3, B2 or B3 and C2 of mixtures A, B and C, expressed in parts by weight of the constituent, lie within the range generally going from 0.5 to 30 and preferably from 1 to 15 parts by weight per 100 parts of the polyorganosiloxane constituent(s) of the curable compositions D.

In constituent A3 (a combination), the ratio of the amount by weight of compound(s) A2.1 to that of compound(s) A2.2 lies within the range generally going from 0.1:1 to 9:1 and preferably from 0.25:1 to 4:1.

In constituent B3 (a combination), the ratio of the amount by weight of compound(s) B2.1 to that of compound(s) B2.2 lies within the range generally going from 0.6:1 to 6:1 and preferably from 0.8:1 to 4:1.

In constituent C2 (a combination), the ratio of the amount by weight of constituent A2 or A3 to that of constituent B2 or B3 lies within the range generally going from 0.02:1 to 1:1 and preferably from 0.05:1 to 0.5:1.

According to an advantageous embodiment of the present invention, use is made, as an additive:
1 of a mixture A of the A1+A3 type where constituent A1 is platinum in the form of a platinum complex or compound and constituent A3 consists of a combination of FeO and Fe$_2$O$_3$;
2 of a mixture B of the B1+B2 type where constituent B1 has the meaning of constituent A1 of 1 and constituent B2 consists of cerium (IV) oxide and/or hydroxide;
3 of a mixture B of the B1+B3 type where constituent B1 has the meaning of constituent A1 of 1 and constituent B3 consists of a combination of cerium (IV) oxide and/or hydroxide and titanium oxide TiO$_2$; or
4 of a mixture C where constituent C1 has the meaning of constituent A1 of 1 and constituent C2 consists of a combination of constituent B3 mentioned in 3 and constituent A3 mentioned in 1;

the amounts of the various constituents A1, A3, B1, B2, B3, C1 and C2, and the ratios that may exist between the amounts of some of them in the case of combinations, lie within the broad ranges referred to as "generally going from ( . . . ) to ( . . . )" mentioned above.

According to a more particularly advantageous embodiment of the present invention, use is made, as an additive, of one of the mixtures mentioned in 1, 2, 3 and 4, for which the amounts of the various constituents, and the ratios which may exist between the amounts of some of them in the case of combinations, lie within the narrow ranges referred to as "preferably ranging from ( . . . ) to ( . . . )" mentioned above.

The curable polyorganosiloxane compositions D falling within the scope of the present invention, presented as one or more (one-component or multicomponent) packages, contain a main constituent formed from one or more polyorganosiloxane constituents, a suitable catalyst and, optionally, one or more compounds selected from the group formed in particular by reinforcing or semi-reinforcing or bulking fillers or fillers serving to modify the rheology of the curable compositions, crosslinking agents, adhesion promoters, plasticizers, catalyst inhibitors and colorants.

The polyorganosiloxanes, forming the main constituents of compositions D falling within the scope of the invention, may be linear, branched or crosslinked and contain hydrocarbon radicals and/or reactive groups consisting of alkenyl groups and hydrogen atoms. It should be noted that the polyorganosiloxane compositions are widely described in the literature and especially in the work by Walter Noll: "Chemistry and Technology of Silicones", Academic Press, 1968, 2nd edition, pages 386 to 409.

More specifically, the polyorganosiloxanes, forming the main constituents of compositions D falling within the scope of the invention, consist of siloxyl units of general formula:

  (I)

and/or siloxyl units of formula:

  (II)

in which formulae the various symbols have the following meaning:
the symbols R, which are identical or different, each represent a non-hydrolysable hydrocarbon-type group, it being possible for this radical to be:
alkyl and haloalkyl radicals having from 1 to 5 carbon atoms and containing from 1 to 6 chlorine and/or fluorine atoms;
cycloalkyl and halocycloalkyl radicals having from 3 to 8 carbon atoms and containing from 1 to 4 chlorine and/or fluorine atoms;
aryl, alkylaryl and haloaryl radicals having from 6 to 8 carbon atoms and containing from 1 to 4 chlorine and/or fluorine atoms;

cyanoalkyl radicals having from 3 to 4 carbon atoms;
the symbols Z each represent a hydrogen atom or a $C_2$-$C_6$ alkenyl group;
n= an integer equal to 0, 1, 2 or 3;
x= an integer equal to 0, 1, 2 or 3;
y= an integer equal to 0, 1 or 2;
the sum x+y lies within the range going from 1 to 3.

By way of illustration, mention may be made among the organic radicals R, directly linked to the silicon atoms, of the following groups: methyl, ethyl; propyl; isopropyl; butyl; isobutyl; n-pentyl; t-butyl; chloromethyl, dichloromethyl; α-chloroethyl; α-β-dichloroethyl; fluoromethyl; difluoromethyl; α-β-difluoroethyl; 3,3,3-trifluoropropyl; trifluorocyclopropyl; 4,4,4-trifluorobutyl; 3,3,4,4,5,5-hexafluoropentyl; β-cyanoethyl; γ-cyanopropyl; phenyl; p-chlorophenyl; m-chlorophenyl; 3,5-dichlorophenyl; trichlorophenyl; tetrachlorophenyl; o-, p- or m-tolyl; α,α,α-trifluorotolyl; xylyls such as 2,3-dimethylphenyl and 3,4-dimethylphenyl.

Preferably, the organic radicals R linked to the silicon atoms are methyl or phenyl radicals, it being possible for these radicals to be optionally halogenated, or else cyanoalkyl radicals.

The symbols Z are hydrogen atoms or alkenyl groups which are preferably vinyl groups.

The nature of the polyorganosiloxane, and therefore the ratios between the siloxyl (I) and (II) units and the distribution of them, is, as is known, chosen depending on the crosslinking treatment which will be carried out on the curable composition for the purpose of converting it into an elastomer.

The two-component or one-component polyorganosiloxane compositions D, crosslinking at room temperature or with the heat from polyaddition reactions, essentially from the reaction of hydrosilyl groups with alkenylsilyl groups, in the presence of a metal catalyst, generally a platinum-based catalyst, are described for example in U.S. Pat. Nos. 3,220,972, 3,284,406, 3,436,366, 3,697,473 and 4,340,709. The polyorganosiloxanes used in these compositions generally consist of pairs based, on the one hand, on a linear, branched or crosslinked polysiloxane consisting of units (II) in which the residue Z represents a $C_2$-$C_6$ alkenyl group and in which x is at least equal to 1, these units (II) being optionally combined with units (I), and, on the other hand, on a linear, branched or crosslinked polyhydrosiloxane consisting of units (II) in which the residue Z then represents a hydrogen atom and in which X is at least equal to 1, these units (II) being optionally combined with units (I).

In the case of compositions D crosslinking by polyaddition reactions called RTV compositions, the polyorganosiloxane constituent(s) carrying alkenylsilyl groups advantageously has (have) a viscosity at 25° C. of at most 100,000 mPa·s and preferably between 400 and 100,000 mPa·s.

In the case of compositions D crosslinking by polyaddition reactions called LSR compositions, the polyorganosiloxane constituent(s) carrying alkenylsilyl groups has (have) a viscosity at 25° C. of greater than 100,000 mPa·s and preferably lying within the range going from a value greater than 100,000 mPa·s to 500,000 mPa·s.

In the case of compositions D crosslinking by polyaddition reactions called polyaddition EVC compositions, the polyorganosiloxane constituent(s) carrying alkenylsilyl groups has (have) a viscosity at 25° C. of greater than 500,000 mPa·s and preferably between 1,000,000 mPa·s and 30,000,000 mPa·s and even higher.

In the case of polyorganosiloxane compositions D called RTV, LSR or polyaddition EVC compositions, the polyorganosiloxane constituent(s) carrying hydrosilyl groups generally has (have) a viscosity at 25° C. of at most 10,000 mPa·s and preferably between 5 and 1000 mPa·s.

Yet other compositions may also be compositions D curing at high temperature by the action of organic peroxides. The polyorganosiloxane or gum used in such compositions, called EVC compositions, then essentially consists of siloxyl units (I), optionally combined with units (II) in which the residue Z represents a $C_2$-$C_6$ alkenyl group and in which x is equal to 1. Such EVC compositions are, for example, described in U.S. Pat. Nos. 3,142,655, 3,821,140, 3,836,489 and 3,839,266.

The polyorganosiloxane constituent of these EVC compositions advantageously has a viscosity at 25° C. of at least 1,000,000 mPa·s and preferably between 2,000,000 and 30,000,000 mPa·s and even higher.

The curable compositions D falling within the scope of the invention may furthermore include —alongside the polyorganosiloxane constituent(s), the catalyst and optionally the crosslinking agent and/or the adhesion promoter and/or the colorant—reinforcing or semi-reinforcing or bulking fillers or fillers serving to modify the rheology, which are preferably chosen from siliceous fillers.

The reinforcing fillers are chosen from pyrogenic silicas and precipitated silicas. They have a specific surface area, measured according to the BET method, of at least 50 $m^2/g$, preferably greater than 100 $m^2/g$ and an average particle size of less than 0.1 micrometer (μm).

These silicas may be preferably incorporated as they are or after they have been treated with organosilicic compounds normally used for this purpose. Among these compounds, are methylpolysiloxanes, such as hexamethyldisiloxane and octamethylcyclotetrasiloxane, methylpolysilazanes, such as hexamethyldisilazane and hexamethylcyclotrisilazane, chlorosilanes, such as dimethyldichlorosilane, trimethylchlorosilane, methylvinyldichlorosilane and dimethylvinylchlorosilane, and alkoxysilanes, such as dimethyldimethoxysilane, dimethylvinylethoxysilane and trimethylmethoxysilane. During this treatment, the silicas may increase their starting weight by up to 20%, preferably approximately 10%.

The semi-reinforcing or bulking fillers or fillers serving to modify the rheology, have a BET specific surface area of less than 100 $m^2/g$ and an average particle diameter of greater than 0.1 μm and are preferably chosen from ground quartz, calcined clays and diatomaceous earths.

When there is a need to do so, from 0.5 to 120% by weight, preferably from 1 to 100% by weight, of filler(s) with respect to the weight of the polyorganosiloxane constituent(s) of compositions D may be used.

Within the scope of the present invention, preferred polyorganosiloxane compositions D are those one-component or two-component compositions crosslinking at room temperature or with the heat from polyaddition reactions, called RTV compositions, which comprise:

(a) 100 parts by weight of at least one polydiorganosiloxane chosen from linear homopolymers and copolymers having at least 2 vinyl groups per molecule, these vinyl groups being linked to different silicon atoms and located in the chain and/or at the chain ends, the other organic radicals of which, linked to the silicon atoms, are chosen from methyl, ethyl and phenyl radicals, at least 60 mol % of these other radicals (and preferably all of these other radicals) being methyl radicals, and having a viscosity ranging from 400 to 100,000 mPa·s at 25° C.;

(b) at least one polyorganohydrosiloxane chosen from linear or cyclic homopolymers and copolymers having at least 2 hydrogen atoms per molecule, these hydrogen atoms being linked to different silicon atoms and the organic radicals of which, linked to the silicon atoms, are chosen from methyl, ethyl and phenyl radicals, at least 60 mol % of these radicals (and preferably all of these other radicals) being methyl radicals, and having a viscosity ranging from 5 to 1000 mPa·s at 25° C., reactant (b) being used in an amount such that the molar ratio of the hydride functional groups of (b) to the vinyl groups of (a) is between 1.1 and 4;

(c) a catalytically effective amount of a platinum catalyst;

(d) 0 to 120 part(s) by weight, preferably from 0 to 100 parts by weight, of siliceous filler(s) per 100 parts by weight of the combination of polyorganosiloxanes (a)+(b).

According to one embodiment, up to 100% by weight of reactant (a) is replaced with a polyorganosiloxane resin containing from 0.1 to 20% by weight of one or more vinyl groups in its structure, the said structure having at least two different units chosen from M (triorganosiloxyl), D (diorganosiloxyl), T (monoorganosiloxyl) and Q ($SiO_{4/2}$) units, at least one of these units being a T or Q unit, it being possible for the vinyl group(s) to be carried by the M, D and/or T units.

Reactant (a) may advantageously be a linear polydiorganosiloxane, the chain of which essentially consists of units (I) where n=2, this chain being terminated at each end by a unit (II) where Z=vinyl and in which x=1 and y=2.

Reactant (b) may advantageously be: a linear polyorganohydrosiloxane containing, in its structure at least 3 hydrogen atoms linked to the silicon, the chain of which essentially consists of units (II) where Z=H and where x=y=1, optionally combined with units (I) where n=2, this chain being terminated at each end by a unit (II) where Z=H and where x=1 and y=2 or by a unit (I) where n=3; or a blend of the said polyorganohydrosiloxane with another linear polyorganohydrosiloxane, the chain of which essentially consists of units (I) where n=2, this chain being terminated at each end by a unit (II) where Z=H and where x=1 and y=2.

The amount by weight of catalyst (c), calculated in parts by weight of platinum metal, is generally between 1 and 250 ppm, preferably between 3 and 100 ppm, based on the weight of the combination of organosiloxanes (a)+(b).

Other preferred polyorganosiloxane compositions D are those one-component or two-component compositions crosslinking with the heat from polyaddition reactions, called LSR compositions. These compositions satisfy the definitions given above with regard to so-called RTV preferred compositions, except with regard to the viscosity of the vinyl-containing polydiorganosiloxane reactant (a) which this time lies within the range going from a value greater than 100,000 mPa·s to 500,000 mPa·s.

Further preferred polyorganosiloxane compositions D are those one-component or two-component compositions crosslinking with the heat from polyaddition reactions, called polyaddition EVC compositions, which comprise:

(a') 100 parts by weight of at least one polydiorganosiloxane gum which is a linear homopolymer or copolymer having at least 2 vinyl groups per molecule, these vinyl groups being linked to different silicon atoms and located in the chain and/or at the chain ends, the other organic radicals of which, linked to the silicon atoms, are chosen from methyl, ethyl and phenyl radicals, at least 60 mol % of these other radicals (and preferably all of these other radicals) being methyl radicals, and the said gum having a viscosity of greater than 500,000 mPa·s at 25° C. and preferably of at least 1,000,000 mPa·s;

(b') at least one polyorganohydrosiloxane chosen from linear, cyclic or network homopolymers and copolymers having at least 3 hydrogen atoms per molecule, these hydrogen atoms being linked to different silicon atoms, and the organic radicals of which, linked to the silicon atoms, are chosen from methyl, ethyl and phenyl radicals, at least 60 mol % of these radicals (and preferably all of these other radicals) being methyl radicals, and having a viscosity ranging from 5 to 1000 mPa·s at 25° C., reactant (b') being used in an amount such that the molar ratio of the hydride functional groups of (b') to the vinyl groups of (a') is between 0.4 and 10 and preferably between 1.1 and 4;

(c') a catalytically effective amount of a platinum catalyst;

(d') 0.5 to 120 parts by weight, preferably from 1 to 100 parts by weight, of siliceous filler(s) per 100 parts by weight of the combination of polyorganosiloxanes (a')+(b').

The gum (a') consists, along its chain, of units (I) where n=2, optionally combined with units (II) where Z=vinyl and where x=y=1, and it is terminated at each end of its chain by a unit (II) where Z=vinyl and where x=1 and y=2 or by a unit (I) where n=3.

Advantageously, at least one linear polyorganohydrosiloxane is used as constituent (b'), the chain of which polyorganohydrosiloxane essentially consists of units (II) where Z=H and where x=y=1, these units (II) being optionally combined with units (I) where n=2, this chain being terminated at each end by a unit (II) where Z=H and where x=1 and y=2 or by a unit (I) where n=3.

The amount by weight of catalyst (c'), expressed in parts by weight of platinum metal with respect to the weight of gum (a') and of hydrosilyl compound (b'), is between 1 and 250 ppm and preferably between 3 and 100 ppm.

The silicone compositions D may furthermore contain, beside constituents (a'), (b'), (c') and (d'), from 1 to 10 parts by weight of silanol-terminated polydimethylsiloxane oil(s) (e'), having a viscosity at 25° C. of between 10 and 1000 mPa·s, per 100 parts of gum (a').

If it is required to retard the crosslinking, it is possible to add a platinum-catalyst inhibitor to the polyorganosiloxane composition D crosslinking by polyaddition reactions, called an RTV, LSR or polyaddition EVC composition. These inhibitors are known. In particular, organic amines, silazanes, organic oximes, diesters of dicarboxylic acids, acetylenic ketones and, above all, as preferred inhibitors, acetylenic alcohols (cf., for example, FR-A-1,528,464, 2,372,874 and 2,704,553) and cyclic polydiorganosiloxanes essentially consisting of units (II) where Z=vinyl and where x=y=1, these units (II) being optionally combined with units (I) where n=2, may be used. The inhibitor, when one is used, is incorporated in an amount of 0.005 to 5 parts by weight, preferably 0.01 to 3 parts by weight, per 100 parts of polyorganosiloxane (a) or of gum (a').

Further preferred polyorganosiloxane compositions D are those one-component compositions, called EVC compositions, comprising:

(a") 100 parts by weight of a polydiorganosiloxane gum which is a linear homopolymer or copolymer having at least 2 vinyl groups per molecule, these vinyl groups being linked to different silicon atoms and located in the chain and/or at the chain ends, the other organic radicals of which, linked to the silicon atoms, are chosen from methyl, ethyl and phenyl radicals, at least 60 mol % of these other radicals (and preferably all of these other radicals) being methyl radicals, and the said gum having a viscosity of at least 1,000,000 mPa·s at 25° C., preferably at least 2,000,000 mPa·s;

(b") 0.1 to 7 parts by weight of an organic peroxide;

(c") 0.5 to 120 parts by weight, preferably from 1 to 100 parts by weight of siliceous filler(s) per 100 parts by weight of gum (a").

Gum (a") consists, along its chain, of units (I) where n=2, is optionally combined with units (II) where Z=vinyl and where x=y=1, and it is terminated at each end of its chain by a unit (II) where Z=vinyl and where x=1 and y=2 or by a unit (I) where n=3; however, the presence, as a mixture with these conforming units, of units of a different structure, for example of formula (I) with n=1 and/or $SiO_{4/2}$ and/or of formula (II) where Z=vinyl and where x=1 and y=0, is not excluded in an amount of at most 2% with respect to the total number of conforming units.

Organic peroxides (b″) are used in an amount of 0.1 to 7 parts, preferably 0.2 to 5 parts, per 100 parts of gums (a″). They are well known to those skilled in the art and comprise more especially benzoyl peroxide, 2,4-dichlorobenzoyl peroxide, dicumyl peroxide, 2,5-bis(t-butylperoxy)-2,5-dimethylhexane, t-butyl perbenzoate, t-butylperoxy isopropyl carbonate, di-t-butylperoxide and 1,1-bis(t-butylperoxy)-3,3,5-trimethylcyclohexane.

The compositions D of the EVC type may furthermore include from 1 to 10 parts by weight of silanol-terminated polydimethylsiloxane oil(s) (d″), having a viscosity at 25° C. of between 10 and 5000 mPa·s, per 100 parts of gum (a″).

The preparation of the polyorganosiloxane compositions D called RTV, LSR, polyaddition EVC and EVC compositions, containing, in addition, the additive for enhancing the arc-tracking and arc-erosion resistance properties which was defined above in the present specification, is carried out using known mechanical means, for example devices equipped with turbomixers, kneaders, screw-type mixers and roll-type mixers. The various constituents are incorporated into these machines, possibly in any order or in an order which takes into account the desired one-component or two-component form of the compositions.

Thus, the polyorganosiloxane compositions D also containing the additive may be one-component compositions, i.e. delivered in a single package; if the composition has to be stored before it is used, it may be desirable to add, in the case of RTV, LSR and polyaddition EVC compositions, an effective amount of an inhibitor (mentioned above) which inhibits the catalytic action of the platinum and disappears by the heat produced during crosslinking of the composition. These compositions D also containing the additive may also be two-component compositions, i.e. delivered in two separate packages, one of them including the crosslinking catalyst; in order to obtain the elastomer, the contents of the two packages are mixed and crosslinking takes place by means of the catalyst. Similar one-component and two-component compositions are well known to those skilled in the art.

The curing compositions D also containing the additive may be crosslinked, in order to obtain elastomers, in a manner known per se at room temperature (23° C.) or at temperatures ranging, for example, from 40° C. to 250° C. depending on the type of composition used (RTV, LSR, polyaddition EVC or EVC).

The compositions D also containing the additive cure to give elastomers having good arc-tracking and arc-erosion resistance properties as well as good flame-resistance properties and good mechanical properties. These elastomers can be used in any application in which polyorganosiloxane elastomers that are difficult to burn and/or that withstand leakage currents and electric arcs may be employed; they may be used, for example, for producing electrical insulation materials, medium-voltage and high-voltage insulators, cable termination accessories, cable joints, anode caps for television tubes and moulded objects or extruded articles for the aeronautics industry.

The following examples are given by way of illustration and may not be regarded as a limitation of the scope of the invention.

EXAMPLES 1 AND 2

A) Preparation of the Elastomers

RTV-type elastomers have been obtained from the one-component compositions defined below:

1) Control Composition No. 1:

Using a laboratory turbomixer, the following are mixed at room temperature (23° C.):

93.3 parts by weight of a suspension which contains:
  67.3 parts by weight of a polydimethylsiloxane oil terminated at each of the ends of the chains by a $(CH_3)_2ViSiO_{0.5}$ unit (Vi=vinyl group), having a viscosity of 600 mPa·s and containing 0.014 Si-Vi functional groups per 100 g of oil;
  26 parts by weight of pyrogenic silica, developing a BET specific surface area of 300 m$^2$/g, treated with hexamethyldisilazane so that the weight of the initial silica is increased by 8%;
4.7 parts by weight of a polydimethylsiloxane oil terminated at each of the ends of the chains by a $(CH_3)_2HSiO_{0.5}$ unit, having a viscosity of 8 mPa·s and containing 0.19 Si—H functional groups per 100 g of oil;
2 parts by weight of a poly(dimethyl)(hydromethyl)siloxane oil terminated at each of the ends of the chains by a $(CH_3)_2HSiO_{0.5}$ unit, having a viscosity of 300 mPa·s and containing in total 0.16 SiH functional groups per 100 g of oil;
0.011 parts by weight of a solution in divinyltetramethyldisiloxane of a platinum complex containing 12% by weight of platinum in ligand coordination with divinyltetramethyldisiloxane (Karstedt catalyst), i.e. 0.0013 parts by weight of platinum metal; and
0.04 parts by weight of the cyclic methylvinylpolysiloxane tetramer containing 1.15 Si-Vi functional groups per 100 g of compound.

2) Composition of Example 1:

This is obtained by adding, by means of a turbo-type mixer, to 100 parts by weight of Control Composition No. 1, 10 parts by weight of a combination of FeO (21% by weight in the combination) and $Fe_2O_3$ (79% by weight in the combination), these oxides having an average diameter of 0.1 μm and a BET specific surface area of 10 m$^2$/g.

3) Control Composition No. 2:

This is obtained by adding, by means of a turbo-type mixer, to 100 parts by weight of Control Composition No. 1, 30 parts by weight of ground natural silica (quartz) having an average diameter of 3 μm and a BET specific surface area of 2 m$^2$/g.

4) Composition of Example 2:

This is obtained by adding, by means of a turbo-type mixer, to 100 parts by weight of Control Composition No. 1 the following:
  25 parts by weight of the ground natural silica used in Control Composition No. 2; and
  5 parts by weight of the combination of iron oxides used in the composition of Example 1.

In order to obtain elastomers, the compositions are crosslinked in suitable moulds (having a thickness of 6 mm in the case of test pieces serving for measuring the hardness and a thickness of 2 mm in the case of test pieces serving for measuring the tear strength and for carrying out the flame-resistance and arc-erosion-resistance tests) for 60 minutes at 150° C. in a ventilated oven sold by the company Heraeus.

B) Evaluation of the Elastomer Properties

The results obtained are given in Table I below:

TABLE I

| Elastomer obtained from: | SAH[1] | TS[2] (N/mm) | Extinction time[3] (s) | Arc-induced weight loss[4] (mg) |
|---|---|---|---|---|
| Control composition No. 1 | 25 | 20 | combustion | 3.3 |
| Composition of Example 1 | 26 | 23 | 8 | 0.7 |
| Control composition No. 2 | 33 | 26 | 46 | 1.8 |
| Composition of Example 2 | 31 | 25 | 5 | 0.6 |

[1]SAH: Shore A hardness; the measurements are carried out according to the stipulations in the DIN 53505 standard;
[2]TS: Tear strength: the measurements are carried out according to the stipulations of the ASTM D 624-A standard;
[3]The flame-resistance tests of the elastomers obtained are carried out according to the protocol defined by The Underwriters Laboratories (UL 94 V), fourth edition of 18 Jun. 1991, which consists in exposing a test piece (with a length of 127 mm, a width of 12.7 mm and a thickness of 2 mm) to a 980° C. flame for an exposure time of 10 seconds, after which the extinction time is measured (each extinction time corresponds to the average of 9 flame-resistance tests);
[4]The arc-erosion resistance tests are carried out according to the protocol defined below: the principle of this test consists in applying locally, on the surface of the material comprising the silicone elastomer, a stress of the "dry band arc" type and in measuring the erosion of the material caused by the stress. One of the specificities of this test resides in the fact that the electric power applied is limited and regulated about an average value of 9 ± 1 watts.

The diagram of the arrangement is given in the appended FIG. 1; in this diagram, the reference numbers (1) to (9) denote, respectively:

(1) the material comprising the silicone elastomer to be tested;
(2) a spike generating the electric arc;
(3) a cell supporting the material (1) and containing water;
(4) water;
(5) a measurement shunt resistor;
(6) a limit resistor;
(7) a high-voltage generator operating at 50 Hz;
(8) a voltage divider; and
(9) a computer whose function is to accurately control the electrical parameters which allow an electric arc to be struck and maintained on the surface of the material (1).

4.1—Execution of the Test:

4.1.1.—Mechanical Positioning of the Specimen:

The specimens, having the dimensions 1.5×2×0.2 cm, are adhesively bonded to epoxy resin plaques 1 cm from the bottom of them.

Figure 2:
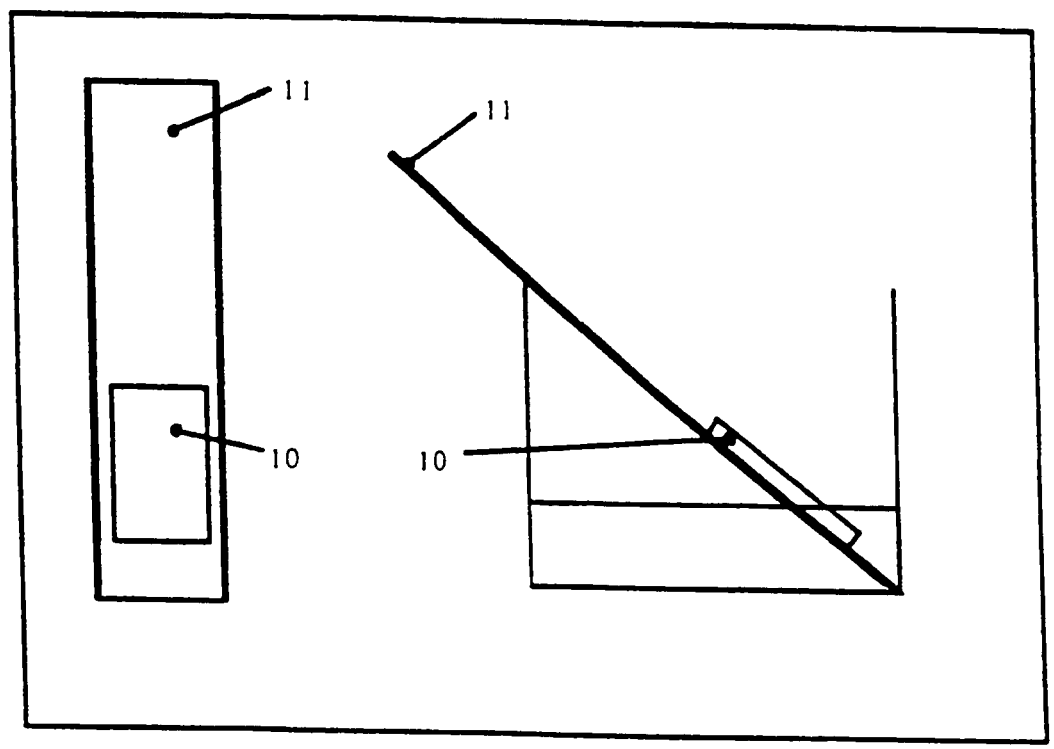
FIG. 2 is a diagrammatic representation of the mechanical positioning of the specimen for execution of the arc-erosion resistance tests described in detail below.
Figure 3:
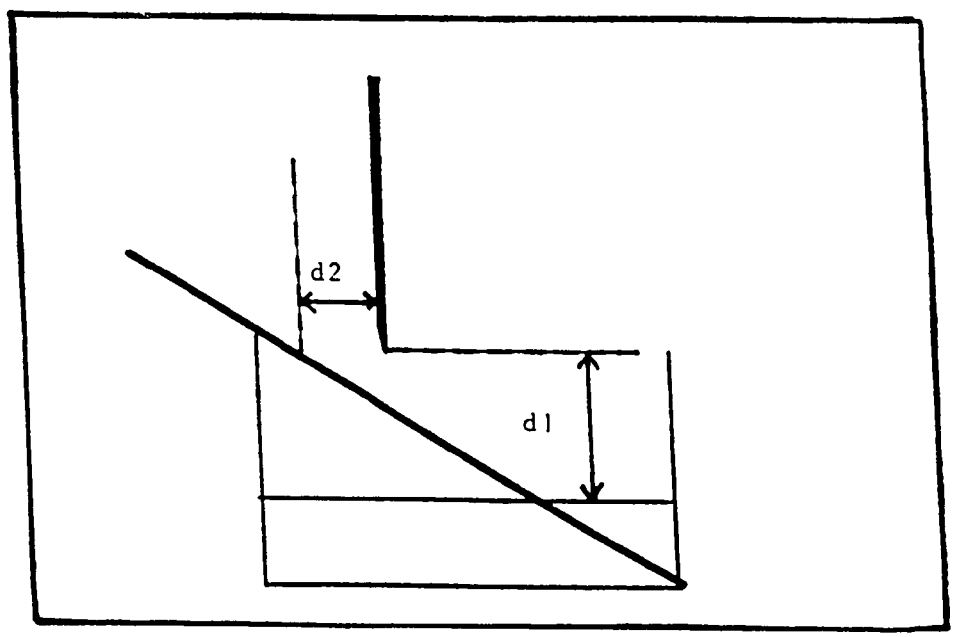
FIG. 3 is a diagrammatic representation of the positioning of the spike relative to the water surface and the specimen for execution of the arc-erosion resistance tests described in detail below.

The plaque is then placed on a support in a glass container so as to make an angle of 50.6° with the horizontal, as shown in the appended FIG. 2 in which the reference number (10) denotes a silicone elastomer specimen and the reference number (11) denotes an epoxy resin plaque. The combination formed by the plaque (11) and the specimen (10) adhesively bonded to it constitutes the material (1) comprising the silicone elastomer mentioned above with regard to FIG. 1. An earth electrode is then formed by winding tin wire around the base of the plaque; the assembly is then placed in the cell and the water level is set to a given distance from the bottom. The spike is then positioned using verniers. The position of the spike for the standard test is 7 mm vertically above the surface of the water and 1.3 mm horizontally away from the specimen, as shown in the appended FIG. 3 in which the distance d1=7 mm and the distance d2=1.3 mm.

4.1.2.—Setting of the Parameters and Starting of the Test:

The no-load voltage of the generator is set at 7 kV.

The system for intermittently washing the specimen is started. The specimen surface treated with the arc is intermittently rinsed so as to remove any ash which forms due to the arc. This washing consists of a very fine jet of water which is directed for 10 seconds every 10 minutes. The water level in the cell is kept constant by suction.

Once all the test parameters have been set, the earth electrode and the spike are connected to the apparatus. The generator can then be switched on.

4.1.3.—End of the Test:

The electrical circuit is opened as soon as the applied energy reaches 500 W.min.

4.2.—Measurement of the Eroded Volumes:

The specimens are removed from the epoxy resin plaques. All traces of ash are removed from the eroded regions by rinsing in water, the specimens then being rinsed in alcohol and then dried.

Figure 4:
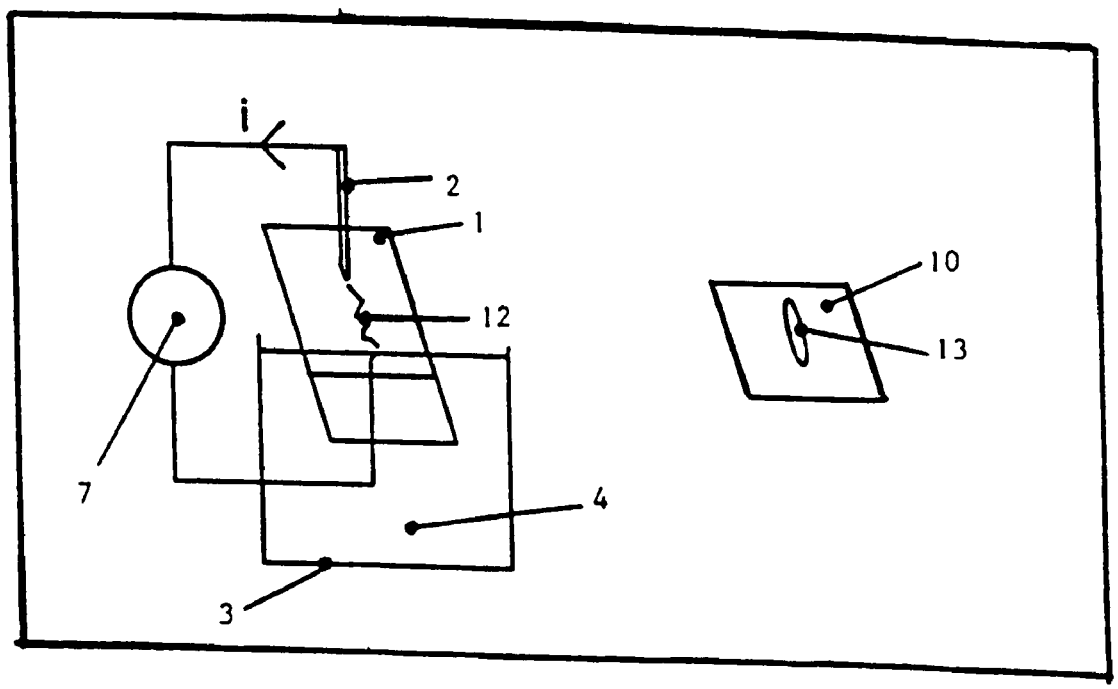
FIG. 4 is a diagrammatic representation of the arrangement used for measurement of the eroded volumes in the arc-erosion resistance tests, as described in detail below.

Next, an epoxy resin sufficiently fluid to be able to be applied and to fill the eroded regions (cf. appended FIG. 4) is mixed. After mixing, the resin must be degassed in a vacuum bell for at least ten minutes. Once the resin has been degassed it is used to fill the erosion marks (holes) in the surface of the specimens and to return them to their initial volumes. Visual inspection is then very important. A cutter blade edge is used to remove the surplus resin from the specimens. After the imprints of the erosion produced have fully cured (overnight), they are demoulded and weighed on a precision balance. The weights found (in mg) are representative of the eroded volumes. In the left-hand part of the appended FIG. 4 are again shown the material (1) comprising the silicone elastomer, the spike (2) generating the electric arc (12), the container (3) containing water (4) and the high-voltage generator (7); in the right-hand part of the appended FIG. 4 are illustrated a silicone elastomer specimen (10) which has been detached from its epoxy resin support plaque and has an arc-induced erosion mark (or hole) (13).

The benefit provided by the iron oxides is manifest. It may also be seen that the results of the flame-resistance tests and of the arc-erosion resistance tests are well correlated.

EXAMPLE 3

A) Preparation of the Elastomers

RTV elastomers were obtained from other one-component compositions defined below:

1) Control Composition No. 3:

Using a laboratory turbomixer, the following are mixed at room temperature (23° C.):

65 parts by weight of a resin having an $MM^{Vi}DD^{Vi}Q$ structure containing 0.55% by weight of vinyl groups and consisting of 17.5% by weight of $(CH_3)_3SiO_{0.5}$ units, 0.3% by weight of $(CH_3)_2ViSiO_{0.5}$ units, 74.5% by weight of $(CH_3)_2Sio$ units, 1.5% by weight of $(CH_3)ViSiO$ units and 6.2% by weight of $SiO_2$ units;

33 parts by weight of ground natural silica (quartz) having an average diameter of 3 µm and a BET specific surface area of 2 m$^2$/g;

2.9 parts by weight of a poly(dimethyl)-(hydromethyl)siloxane oil terminated at each of the ends of the chains by a $(CH_3)_2HSiO_{0.5}$ unit, having a viscosity of 25 mPa·s and containing in total 0.7 Si—H functional groups per 100 g of oil;

0.0063 parts by weight of a solution in divinyltetramethyldisiloxane of a platinum complex containing 12% by weight of platinum in ligand coordination with divinyltetramethyldisiloxane (Karstedt catalyst), i.e. 0.00075 parts by weight of platinum metal; and 0.03 parts by weight of inhibitor consisting of 1-ethynyl-1-cyclohexanol.

2) Composition of Example 3:

This is obtained by adding, using a turbo-type mixer, to 100 parts by weight of Control Composition No. 3, 5 parts by weight of the combination of iron oxides used in the composition of Example 1.

In order to obtain the elastomers, the compositions are crosslinked for 60 minutes at 150° C. in a ventilated oven sold by the company Heraeus.

B) Evaluation of the Elastomer Properties

The results obtained are given in Table II below:

TABLE II

| Elastomer obtained from: | SAH[1] | TS[2] (N/mm) | Extinction time[3] (s) | Arc-induced weight loss[4] (mg) |
|---|---|---|---|---|
| Control composition No. 3 | 60 | 12 | 8 | 3.9 |
| Composition of Example 3 | 50 | 10 | 2 | 2.1 |

Notes (1) to (4): cf. Table I

EXAMPLES 4 TO 6

A) Preparation of the Elastomers

RTV-type elastomers were obtained from other one-component compositions as defined below:

1) Control Composition No. 4:

Using a laboratory turbo-mixer, the following are mixed at room temperature (23° C.):

93.4 parts by weight of a suspension which contains:

70.4 parts by weight of the polydimethylsiloxane oil terminated at each of the ends of the chains by a $(CH_3)_2ViSiO_{0.5}$ unit used in Control Composition No. 1;

23 parts by weight of the pyrogenic silica treated with hexamethyldisilazane used in Control Composition No. 1;

1.7 parts by weight of ground natural silica (quartz) having an average diameter of 2 μm and a BET specific surface area of 3 m$^2$/g;

3.0 parts by weight of the polydimethylsiloxane oil terminated at each of the ends of the chains by a $(CH_3)_2HSiO_{0.5}$ unit used in Control Composition No. 1;

1.9 parts by weight of a poly(dimethyl)-(hydromethyl)siloxane oil terminated at each of the ends of the chains by a $(CH_3)_3SiO_{0.5}$ unit, having a viscosity of 10 mPa·s and containing in total 0.36 Si—H functional groups per 100 g of oil;

0.025 parts by weight of a solution in divinyltetramethyldisiloxane of a platinum complex containing 12% by weight of platinum in ligand coordination with divinyltetramethyldisiloxane (Karstedt catalyst), i.e. 0.003 parts by weight of platinum metal; and 0.08 parts by weight of the cyclic methylvinylpolysiloxane tetramer containing 1.15 Si-Vi functional groups per 100 g of the compound.

2) Composition of Example 4:

This is obtained by adding, by means of a turbo-type mixer, to 100 parts by weight of Control Composition No. 4, 3 parts by weight of anhydrous cerium (IV) hydroxide, this hydroxide having an average diameter of 2 μm and a BET specific surface area of 1 m$^2$/g.

3) Composition of Example 5:

This is obtained by adding, by means of a turbo-type mixer, to 100 parts by weight of Control composition No. 4:

3 parts by weight of the cerium (IV) hydroxide used in the composition of Example 4; and 3 parts by weight of titanium oxide TiO$_2$, having an average diameter of 0.03 μm and a BET specific surface area of 50 m$^2$/g.

4) Composition of Example 6:

This is obtained by adding, by means of a turbo-type mixer, to 100 parts by weight of Control Composition No. 4:

3 parts by weight of the cerium (IV) hydroxide used in the composition of Example 4;

1 part by weight of the TiO$_2$ used in the composition of Example 5; and 0.25 parts by weight of the combination of iron oxides used in the composition of Example 1.

In order to obtain the elastomers, the compositions are crosslinked for 60 minutes at 150° C. in a ventilated oven sold by the company Heraeus.

B) Evaluation of the Elastomer Properties

The results obtained are given in Table III below:

TABLE III

| Elastomer from: | SAH[1] | TS[2] (N/mm) | UL 94 Classification[3] |
|---|---|---|---|
| Control composition No. 4 | 32 | 18 | V1 - 6/9 |
| Composition of Example 4 | 31 | 16 | V1 - 9/9 |
| Composition of Example 5 | 35 | 18 | V1 - 9/9 |
| Composition of Example 6 | 32 | 19 | V0 - 9/9 |

Notes (1), (2) and (3): cf. Table I.

It should be noted that in the case of the UL 94 test, the classification is completed by indicating the number of test pieces (out of a total of 9) which meet the classification obtained.

What is claimed is:

1. A composition for enhancing the arc-tracking and arc-erosion resistance properties of an article, comprising:

a) a suspension containing (i) a polydimethylsiloxane oil terminated at each end of the chains by a $(CH_3)_2ViSiO_{0.5}$ unit, where Vi is a vinyl group, and (ii) pyrogenic silica;

b) a polydimethylsiloxane oil terminated at each end of the chains by a $(CH_3)_2HSiO_{0.5}$ unit;

c) a poly(dimethyl)(hydromethyl)siloxane oil terminated at each end of the chains by a $(CH_3)_2HSiO_{0.5}$ unit;

d) a platinum complex;

e) a cyclic methylvinylpolysiloxane tetramer; and f) FeO and Fe$_2$O$_3$;

wherein the composition contains an effective amount of d) and f) to enhance the arc-tracking and arc-erosion resistance properties of the article, the composition having an extinction time of no more than 8 s, as determined by UL 94V, wherein in said composition the ratio of the amount by weight of FeO to that of $Fe_2O_3$ lies within the range of from 0.1:1 to 9:1, and wherein the ratio of the amount by weight of the platinum metal in d) to the amount by weight of f) is from about 1:3846 to about 1:7692.

2. The composition according to claim 1, wherein a), b), c), d) and e) form a composition A, and the composition contains 100 parts by weight of the composition A and 10 parts by weight of f).

3. The composition according to claim 1, wherein:
a), b), c), d) and e) form a composition A;
composition A contains 93.3 parts by weight of a); 4.7 parts by weight of b), 2 parts by weight of c), 0.011 parts by weight of a solution containing d), and 0.04 parts by weight of e); and
the composition contains 100 parts by weight of the composition A and 10 parts by weight of f).

4. The composition according to claim 1, further comprising quartz.

5. The composition according to claim 4, consisting essentially of a)-f) and quartz.

6. A method for enhancing the arc-tracking and arc-erosion resistance properties of an article, comprising incorporating an effective amount of the composition of claim 1 into said article.

7. An article having good arc-tracking and arc-erosion resistance properties, and good flame-resistance properties and good mechanical properties, which is made of the composition according to claim 1.

8. An article according to claim 7, which comprises electrical insulation material, a medium-voltage or high-voltage insulator, a cable termination accessory, a cable joint, an anode cap for a television tube or a moulded object or extruded article for the aeronautics industry.

9. A composition for enhancing the arc-tracking and arc-erosion resistance properties of an article, comprising:

a) a resin containing $(CH_3)_3SiO_{0.5}$ units; $(CH_3)_2ViSiO_{0.5}$ units, where Vi is a vinyl group; $(CH_3)_2SiO$ units; $(CH_3)ViSiO$ units and $SiO_2$ units;
b) silica;
c) a poly(dimethyl)(hydromethyl)siloxane oil terminated at each end of the chains by a $(CH_3)_2HSiO_{0.5}$ unit;
d) a platinum complex;
e) 1-ethynyl-1-cyclohexanol; and
f) FeO and $Fe_2O_3$;
wherein the composition contains an effective amount of d) and f) to enhance the arc-tracking and arc-erosion resistance properties of the article; and
wherein a), b), c), d) and e) form a composition A, and the composition contains 100 parts by weight of the composition A and 5 parts by weight of f), wherein in said composition the ratio of the amount by weight of FeO to that of $Fe_2O_3$ lies within the range of from 0.1:1 to 9:1, and wherein the ratio of the amount by weight of the platinum metal in d) to the amount by weight of f) is from about 1:3846 to about 1:7692.

10. A method of enhancing the arc-tracking and arc-erosion resistance properties of an article, comprising incorporating an effective amount of the composition of claim 9 into said article.

11. The composition according to claim 10, wherein: composition A contains 65 parts by weight of a); 33 parts by weight of b), 2.9 parts by weight of c), 0.0063 parts by weight of d), and 0.03 parts by weight of e).

12. The composition according to claim 10, wherein the composition has an extinction time of 2 s, as determined by UL 94V.

13. An article having good arc-tracking and arc-erosion resistance properties, and good flame-resistance properties and good mechanical properties, which is made of the composition according to claim 9.

14. An article according to claim 13, which comprises electrical insulation material, a medium-voltage or high-voltage insulator, a cable termination accessory, a cable joint, an anode cap for a television tube or a moulded object or extruded article for the aeronautics industry.

* * * * *